US012686010B2

(12) United States Patent
Dil

(10) Patent No.: US 12,686,010 B2
(45) Date of Patent: Jul. 21, 2026

(54) MAGNETIC STIRRER WITH LIFTING TABLE

(71) Applicant: Hans Heidolph GmbH, Kelheim (DE)

(72) Inventor: Roman Dil, Röthenbach an der Pegnitz (DE)

(73) Assignee: Hans Heidolph GmbH, Kelheim (DE)

( * ) Notice: Subject to any disclaimer, the term of this patent is extended or adjusted under 35 U.S.C. 154(b) by 524 days.

(21) Appl. No.: 18/278,403

(22) PCT Filed: Feb. 22, 2022

(86) PCT No.: PCT/EP2022/054296
§ 371 (c)(1),
(2) Date: Aug. 22, 2023

(87) PCT Pub. No.: WO2022/179993
PCT Pub. Date: Sep. 1, 2022

(65) Prior Publication Data
US 2024/0131520 A1    Apr. 25, 2024
US 2024/0226902 A9    Jul. 11, 2024

(30) Foreign Application Priority Data
Feb. 23, 2021    (DE) .......................... 202021100897.0

(51) Int. Cl.
B01L 9/00        (2006.01)
A47B 9/16        (2006.01)
(Continued)

(52) U.S. Cl.
CPC .................................... B01L 9/00 (2013.01);
A47B 9/16 (2013.01); A47B 37/00 (2013.01);
B01F 33/452 (2022.01);
(Continued)

(58) Field of Classification Search
CPC ........ B01L 9/00; B01L 7/00; B01L 2200/147;
B01L 2300/023; B01L 2300/1805;
(Continued)

(56) References Cited

U.S. PATENT DOCUMENTS 3,623,707 A * 11/1971 Klopp ................... B66F 7/0608
187/269
4,059,408 A     11/1977 Boisde et al.
(Continued)

FOREIGN PATENT DOCUMENTS

CN        201537471        8/2010
CN        205761243 U      12/2016
(Continued)

OTHER PUBLICATIONS

International Search Report in relation to International Application No. PCT/EP2022/054296, dated May 24, 2022, 05 pages.
(Continued)

*Primary Examiner* — Jennifer Wecker
*Assistant Examiner* — Britney N. Washington
(74) *Attorney, Agent, or Firm* — Bochner PLLC; Andrew D. Bochner

(57)                ABSTRACT

The invention relates to an arrangement comprising a magnetic stirrer, having a heating plate and a control unit for controlling the magnetic stirrer, and a lifting table having a platform on which the magnetic stirrer can be placed, characterized in that the lifting table has an electric motor to raise and lower the platform, and in that a wireless or wired interface is provided between the magnetic stirrer and the lifting table and the control unit is configured to control the electric motor, in particular the power supply of the electric motor, via the interface.

25 Claims, 5 Drawing Sheets

Figure 1:
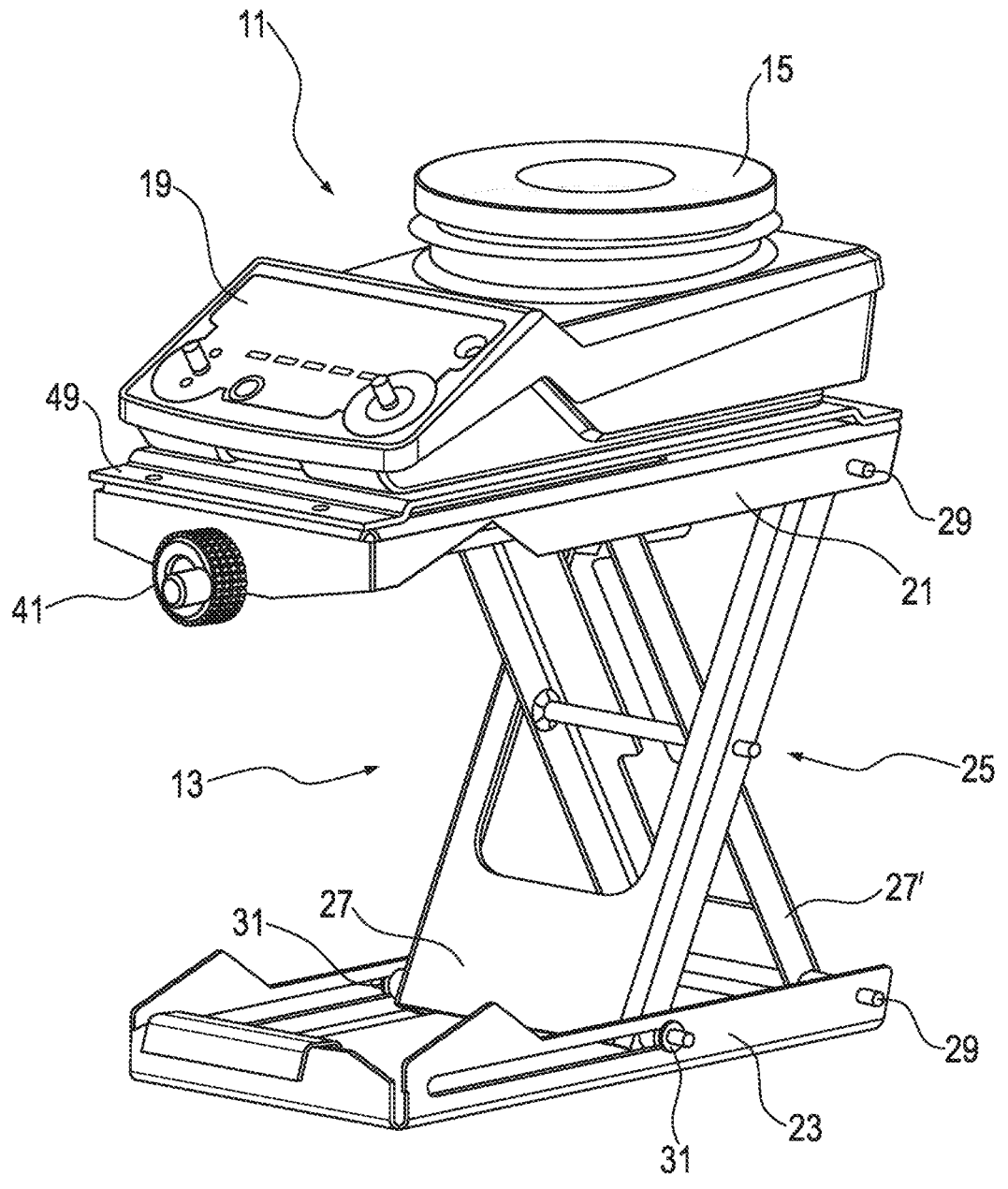

(51) Int. Cl.

| | |
|---|---|
| *A47B 37/00* | (2006.01) |
| *B01F 33/452* | (2022.01) |
| *B01F 35/21* | (2022.01) |
| *B01F 35/43* | (2022.01) |
| *B01F 35/90* | (2022.01) |
| *B01F 35/92* | (2022.01) |
| *B01F 101/23* | (2022.01) |
| *B01L 7/00* | (2006.01) |
| *F16M 11/18* | (2006.01) |

(52) U.S. Cl.
CPC .......... *B01F 35/2115* (2022.01); *B01F 35/43* (2022.01); *B01F 35/92* (2022.01); *B01L 7/00* (2013.01); *F16M 11/18* (2013.01); *A47B 2037/005* (2013.01); *A47B 2200/006* (2013.01); *B01F 2035/99* (2022.01); *B01F 2101/23* (2022.01); *B01L 2200/147* (2013.01); *B01L 2300/023* (2013.01); *B01L 2300/1805* (2013.01); *F16M 2200/061* (2013.01)

(58) Field of Classification Search
CPC ....... B01L 2200/025; B01L 2300/1827; B01L 2400/043; B01L 7/02; B01L 7/52; A47B 9/16; A47B 37/00; A47B 2037/005; A47B 2200/006; B01F 33/452; B01F 35/2115; B01F 35/43; B01F 35/92; B01F 2035/99; B01F 2101/23; F16M 11/18; F16M 2200/061; F16M 11/24; G05D 23/1917
See application file for complete search history.

(56) References Cited

U.S. PATENT DOCUMENTS

| | | | |
|---|---|---|---|
| 2005/0077286 A1* | 4/2005 | McFadden | .......... B01F 35/2214 |
| | | | 219/490 |
| 2016/0136539 A1 | 5/2016 | Carl et al. | |
| 2016/0151751 A1* | 6/2016 | Eble | ....................... G01K 13/08 |
| | | | 366/146 |

FOREIGN PATENT DOCUMENTS

| | | | |
|---|---|---|---|
| CN | 205867620 U | 1/2017 |
| CN | 207887102 U | 9/2018 |
| CN | 108671828 A | 10/2018 |
| CN | 210775365 U | 6/2020 |
| DE | 7707592 U1 | 9/1977 |
| DE | 19507181 A1 | 9/1996 |
| DE | 202005015235 U1 | 1/2006 |
| DE | 102009006819 A1 | 8/2010 |
| DE | 102013204459 A1 | 9/2014 |
| WO | 2008055998 A1 | 5/2008 |

OTHER PUBLICATIONS

Office Action of the Chinese Patent Office in related CN Patent Appl. No. 202280016525.7, dated Dec. 31, 2025, 15 pages.

* cited by examiner

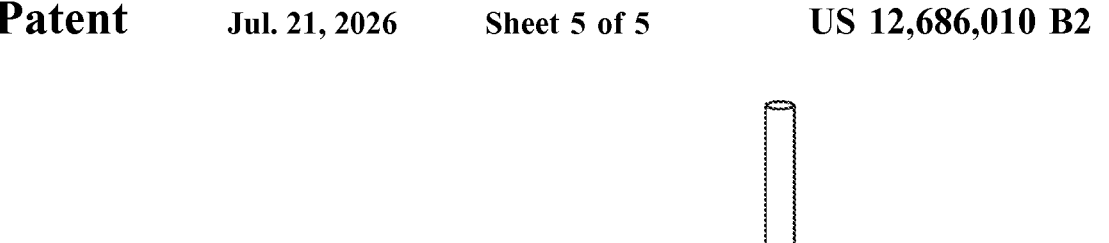
FIG. 5
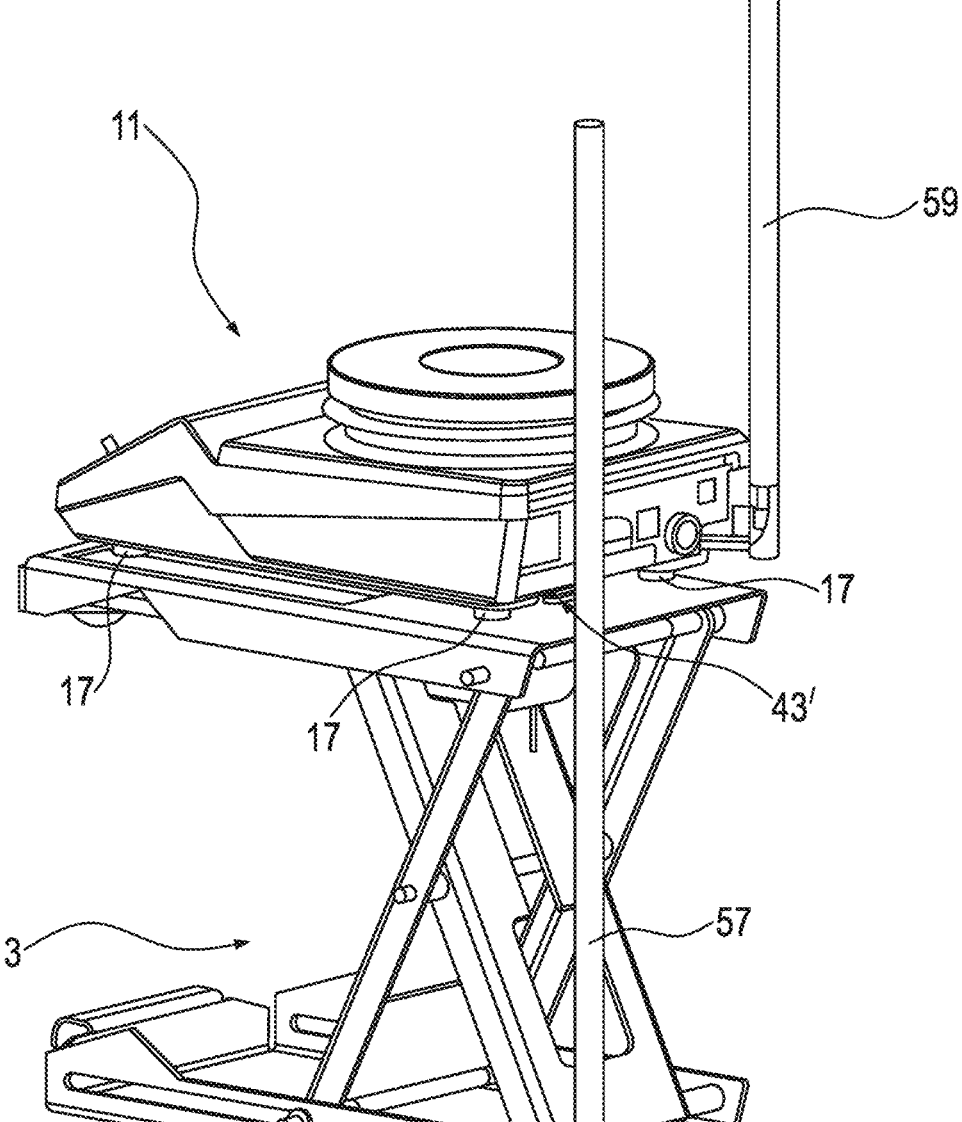

MAGNETIC STIRRER WITH LIFTING TABLE

The invention relates to an arrangement comprising a magnetic stirrer, having a heating plate and a control unit for controlling the magnetic stirrer, and a lifting table having a platform on which the magnetic stirrer can be placed.

A magnetic stirrer is an electrical device that is used in the laboratory to stir liquids. In reflux, distillation or sublimation structures, for example, the respective liquid is located in a reaction glass vessel, in particular a reaction glass flask, that is part of a glass structure comprising a laboratory cooler adjoining the reaction glass vessel, wherein the glass structure is fastened to a table stand or to a grid arranged at the back wall of a fume hood. The reaction glass vessel is in this respect immersed in a heating bath or the like placed onto the heating plate. A magnetic stir bar with which the liquid can be stirred is located in the reaction glass vessel. For this purpose, a rotatingly driven magnet is usually provided in the magnetic stirrer beneath the heating plate and generates a magnetic field that accordingly acts on the magnetic stir bar. The liquid can be simultaneously heated during the stirring by the heating plate. Instead of a heating bath, a heating dish or a heating mantle can also be used, for example.

To ensure a convenient coupling of the liquid to the energy supply by the heating plate and a separation of the liquid from the energy supply, it is known to place the magnetic stirrer onto the platform of a manually actuable lifting table. The magnetic stirrer and the heating bath placed onto it can then be raised and lowered by the operator, e.g. via, a hand crank of the lifting table, to immerse the reaction glass vessel in the heating bath or to remove it from the heating bath. However, this poses a certain safety risk, in particular for applications with an increased hazard.

It is the underlying object of the invention to provide a possibility of minimizing the safety risk when using a magnetic stirrer for an application comprising a heating bath and a glass structure, as is described above.

This object is satisfied by the features of claim 1, and in particular in that the lifting table has an electric motor to raise and lower the platform, and in that a wireless or wired interface is provided between the magnetic stirrer and the lifting table and the control unit is configured to control the electric motor, in particular the power supply of the electric motor, via the interface.

In accordance with the invention, the lifting table no longer has to be manually operated; instead, the lifting and lowering of the lifting table is controlled by the control unit and takes place electrically. This can prevent the lifting table and the heating bath placed onto it from being accidentally knocked over or tipped over due to improper manual operation. Furthermore, on an automatic control by the control unit, the operator can keep the movable front panel of the fume hood closed so that the operator is protected from splashing liquids and/or splinters in a hazardous situation such as a boiling delay, an uncontrolled reaction, or an explosion.

The control unit of the magnetic stirrer is preferably configured to automatically lower the platform of the lifting table when a predefined time elapses and/or when a predefined reference value is exceeded or fallen below by a measurement value acquired by a measuring sensor, in particular a temperature sensor. By specifying a time after which the platform is automatically lowered, it can be achieved that the application is safely terminated in good time before a hazard can arise due to an excessively long process duration. Additionally or alternatively, the platform can be automatically lowered quickly, i.e. without loss of time, when a critical process state occurs, for example, when a permitted temperature of the liquid present in the reaction glass vessel or of the heating bath liquid is exceeded.

The measuring sensor can be part of the claimed arrangement. Furthermore, a further measuring sensor, in particular a further temperature sensor, can be provided that is part of the arrangement. The temperature of the liquid present in the reaction glass vessel can then be monitored by the one measuring sensor and the temperature of the heating bath liquid can be monitored by the other measuring sensor. In this respect, provision can be made that one of the two measuring sensors, namely that measuring sensor that is immersed in the heating bath liquid, is attached to a holding apparatus of the arrangement, in particular a holding rod, that is fastened to the platform of the lifting table or to the magnetic stirrer. When the platform and thus the heating bath are lowered, this measuring sensor is also lowered accordingly so that this measuring sensor can also continue to monitor the temperature of the heating bath. The measuring sensor, which is immersed in the liquid present in the reaction glass vessel, is preferably fastened such that it—like the glass structure—is not moved along when the platform is raised or lowered.

In accordance with one embodiment of the invention, the interface becomes functional by placing the magnetic stirrer onto the platform of the lifting table. The connection of the electric motor to the control unit of the magnetic stirrer then takes place in the manner of a docking station, i.e, by simply docking the magnetic stirrer at the lifting table, if the magnetic stirrer is not placed onto the platform of the lifting table, the electric motor of the lifting table cannot be controlled by the control unit of the magnetic stirrer.

For example, the wired interface can comprise an electrical plug-in connection, in particular having a plug, in particular a built-in plug, and a socket, in particular a built-in socket. In this respect, the plug can be provided at the lifting table side and the socket can be provided at the magnetic stirrer side, or vice versa. The wireless interface can comprise two inductively cooperating coils, of which a first coil is provided at the magnetic stirrer side and a second coil is provided at the lifting table side.

In accordance with a preferred embodiment of the invention, only the magnetic stirrer has a power supply, in particular a power supply unit, and the electric motor of the lifting table is supplied with power via the interface. The lifting table then does not have a power supply of its own, in particular does not have a power supply unit of its own. A cost advantage can hereby be achieved. Furthermore, both devices, the magnetic stirrer and the lifting table or the electric motor of the lifting table, can be connected with only one common cable, wherein, by reducing the number of cables, the risk of accidents at the placement site of the arrangement can be reduced.

Furthermore, the control unit can be configured to transmit data, such as an upper and a lower end position of the platform, to the lifting table via the interface.

The magnetic stirrer preferably comprises, at its lower side, a plurality of support feet that, when the magnetic stirrer is placed onto the platform of the lifting table, engage into counter-shaped recesses formed at the upper side of the platform. A precise positioning of the magnetic stirrer on the lifting table or on the platform of the lifting table can hereby be achieved. The aforementioned plug and socket or first coil and second coil can in particular hereby be arranged in precise positions relative to one another. Furthermore, the form fit between the support feet and the recesses makes it difficult for the magnetic stirrer to be accidentally moved on the platform of the lifting table, and thus for the magnetic stirrer to be accidentally pushed off the lifting table, so that the safety of the arrangement can be increased.

The platform of the lifting table can comprise an adapter plate and the recesses can be formed in the adapter plate. By means of an adapter plate, a magnetic stirrer can be adapted to mutually different lifting tables or a lifting table can be adapted to mutually different magnetic stirrers.

In accordance with a further embodiment of the invention, the lifting table has a base which is not moved when the platform is raised and lowered and to which a holding apparatus of the arrangement, in particular a holding rod, for a glass structure, in particular having a reaction glass flask for a liquid to be heated, is fastened, wherein the glass structure can be part of the claimed arrangement. As described at the beginning, it is known to fasten the glass structure to a table stand or to a grid present at the back wall of a fume hood. The table stand or the grid arranged at the back wall of the fume hood can be saved by the holding apparatus fastened to the base of the lifting table. Furthermore, compared to the use of a grid located at the very back of the fume hood, there is the advantage of easier accessibility and thus better operability.

The lifting table is preferably configured as a scissor lifting table comprising the platform, the aforementioned base, and a scissor unit arranged between the platform and the base. Such a lifting table can be implemented simply, on the one hand, and in a stable manner, on the other hand. The platform, the base and the scissor unit can each be realized from sheet metal and thus inexpensively. The scissor unit in particular has two scissor arms that are arranged in a crossed manner and that are connected to one another in an articulated manner at their centers, with the four ends of the two scissor arms being supported at the platform and the base via two fixed bearings and two floating bearings, in particular slotted controls.

The lifting table can comprise, as a drive, a screw gear having an axially fixed threaded spindle and a threaded nut, with the threaded spindle being driven by the electric motor and the threaded nut being displaceably guided in the two floating bearings. Such a drive is easy to implement and allows a precise setting of the desired height of the platform in each case.

The electric motor and the screw gear are preferably provided at the platform of the lifting table, in particular at the lower side of the platform of the lifting table. Thus, electrical lines are not necessary that would otherwise have to be routed to the base of the lifting table. Furthermore, the threaded spindle can additionally be provided with a hand crank, in particular a crank wheel. The lifting table can thus also be manually actuated. This is in particular advantageous if the electric motor or the control of the electric motor is defective.

Further advantageous embodiments of the invention are described in the dependent in the description of the Figures, and in the drawing.

Figure 2:
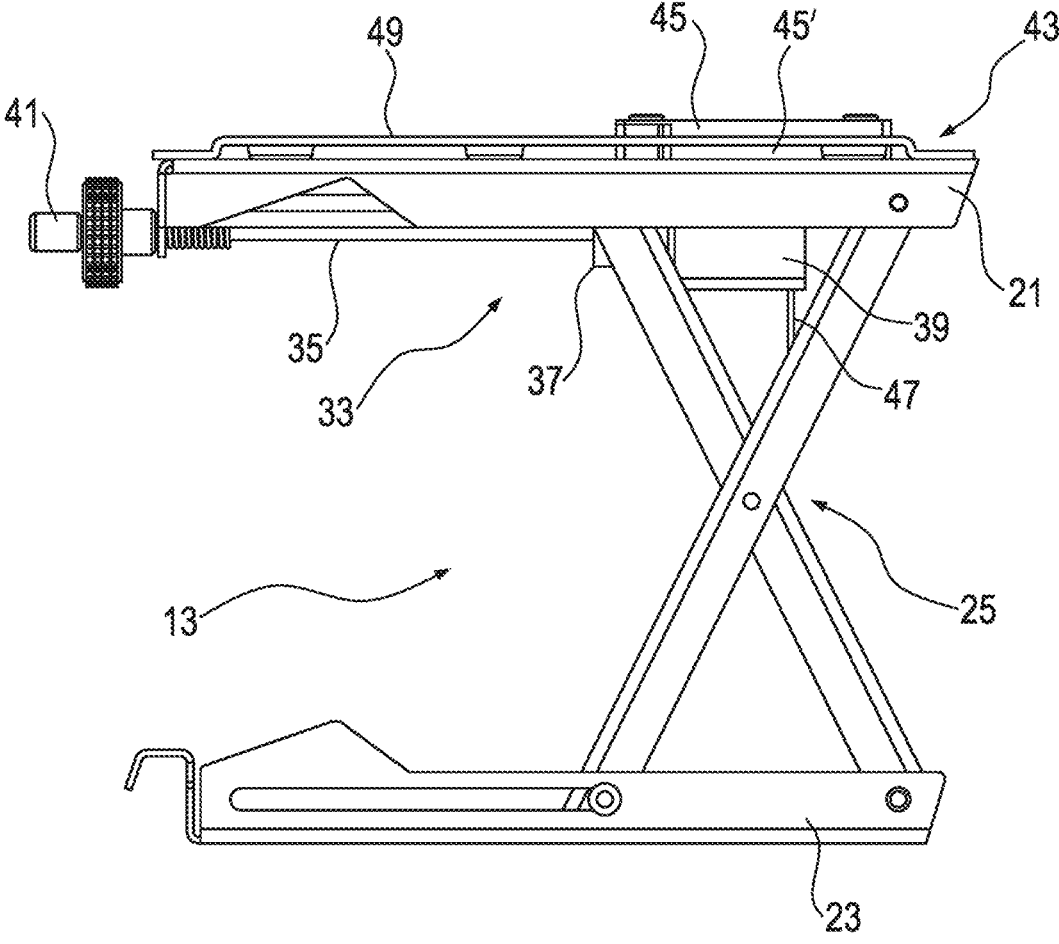
Figure 3:
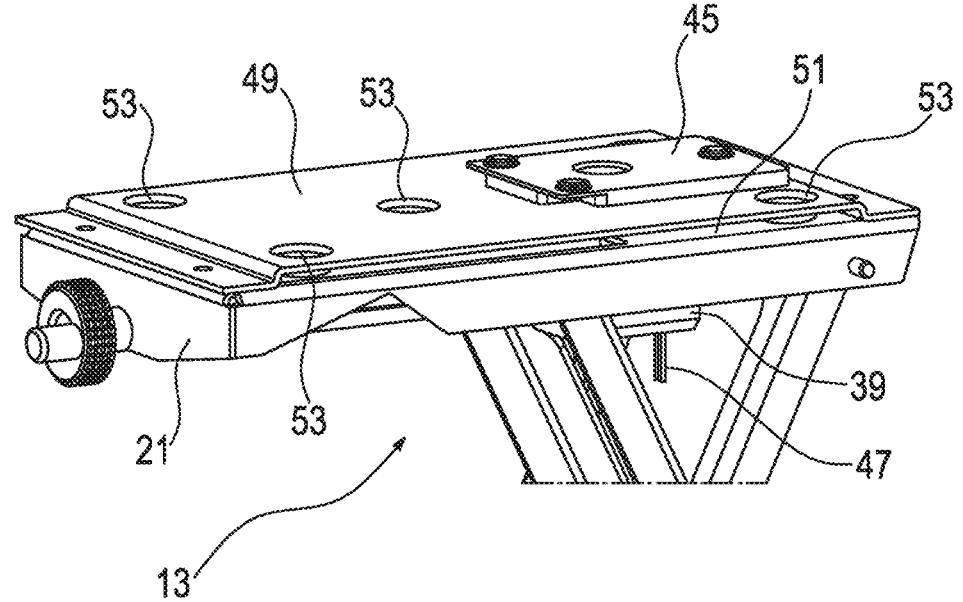
Figure 4:
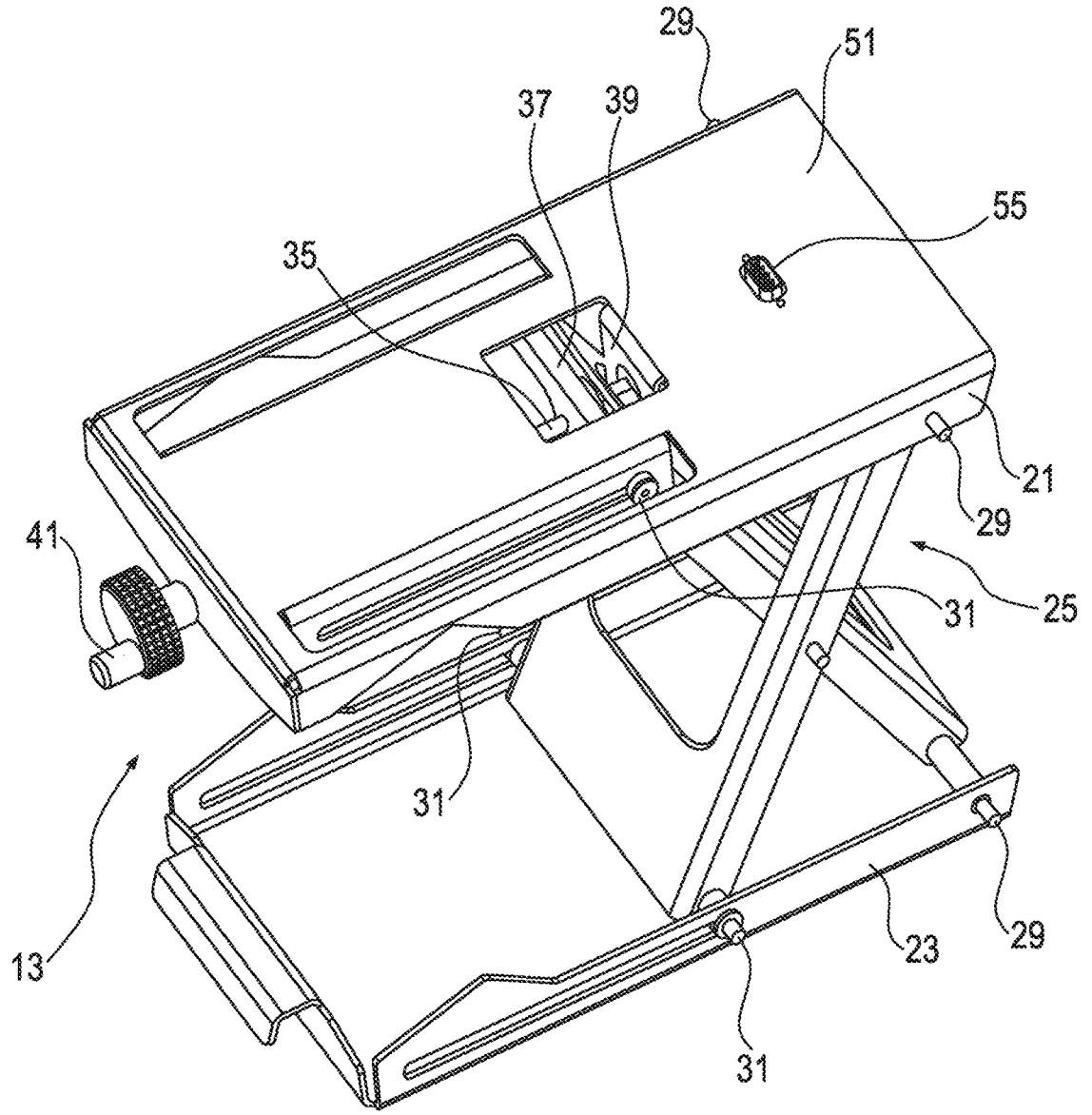

Non-restricting embodiments of the invention are shown in the drawing and will be described in the following. There are shown FIG. 1 a first arrangement in accordance with the invention with a magnetic stirrer and a lifting table in a perspective view;

FIG. 2 the lifting table of FIG. 1 in an individual representation in a side view;

FIG. 3 a section of the lifting table from FIG. 1 in an individual representation in a perspective view;

FIG. 4 a further lifting table in a perspective view; and

FIG. 5 a second arrangement in accordance with the invention with a further magnetic stirrer and the further lifting table from FIG. 4 in a perspective view.

In FIG. 1, an arrangement is shown in which a magnetic stirrer 11 is placed onto a platform 21 of a lifting table 13 that can be raised and lowered.

The magnetic stirrer 11 comprises a heating plate 15 which is heated by a heating device integrated therein and onto which a heating bath, not shown, can be placed, said heating bath being filled with a liquid heat transfer medium such as water. A reaction glass flask, not shown, in which a liquid is present in which a chemical reaction is to take place at an elevated temperature, as is the case in reflux, distillation or sublimation processes, can be immersed in the heating bath. The reaction glass flask, together with a laboratory cooler adjoining the reaction glass vessel, is part of a glass structure, fixedly fastened to a holding apparatus, for carrying out the processes mentioned. Below the heating plate 15, a drive in the form of an electric motor is provided in the magnetic stirrer 11, said drive rotating a magnet at a controllable speed so that a changing magnetic field is generated that is suitable for setting a magnetic stir bar, which is located in the reaction glass flask and which is also designated as a stirring flea, into a stirring movement. Furthermore, the magnetic stirrer 11 comprises a user interface 19 to sot the desired heating temperature and the desired stirring speed. The inputs at the user interface 19 are forwarded to a control unit of the magnetic stirrer 11 that is arranged within the magnetic stirrer 11 and that controls the magnetic stirrer 11.

The magnetic stirrer 11 and the heating bath can be raised and lowered by the lifting table 13 to immerse the reaction glass vessel in the heating bath or to remove it from heating bath. The lifting table 13 is configured as a scissor lifting table that, in addition to the platform 21 and a base 23 that is not moved when the platform is raised and lowered, comprises a scissor unit 25 arranged between the platform 21 and the base 23. The scissor unit 25 has two scissor arms 27, 27' that are arranged in a crossed manner and that are connected in an articulated manner at their centers. The one scissor arm 27 is connected in an articulated manner at one end to the base 23 via a fixed bearing 29 and at the other end to the platform 21 via a floating bearing 31, and the other scissor arm 27' is connected in an articulated manner at one end to the platform 21 via a fixed bearing 29 and at the other end to the base 23 via a floating bearing 31. The two fixed bearings 29 each comprise two fixed bearing points which are opposite one another with respect to the scissor plane and al which the respective scissor arm 27, 27' is connected in an articulated manner to the base 23 or the platform 21. The two floating bearings 31 each comprise two slotted controls that are disposed opposite one another with respect to the scissor plane and that have longitudinal slots in which the respective scissor arm 27, 27' is displaceably guided at the base 23 or the platform 21 (cf also FIG. 4 in this respect).

The driving of the lifting table 13 or the raising and lowering of the platform 21 takes place via a screw gear 33 (cf. FIG. 2). The screw gear 33 comprises an axially fixed threaded spindle 35, which is driven by an electric motor 39, and a threaded nut 37 that is displaceably guided in the two floating bearings 31. The electric motor 39 and the screw gear 33 are arranged at the lower side of the platform 21 of the lifting table 13. In addition to the electrical actuation via the electric motor 39, the lifting table 13 can additionally also be manually actuated, and indeed via a hand crank 41 in the form of a crank wheel.

The electric motor 39 of the lifting table 13 is controlled by the control unit of the magnetic stirrer 11. For this purpose, a wireless interface 43 is provided between the magnetic stirrer 11 or the control unit of the magnetic stirrer 11 and the lifting table 13 or the electric motor 39 of the lifting table 13, said wireless interface 43 becoming functional by placing the magnetic stirrer 11 onto the platform 21 of the lifting table 13. The wireless interface 43 comprises two inductively cooperating coils 45, 45,' namely a first coil 45 and a second coil 45'. The first coil 45 is fastened to the lower side of the magnetic stirrer 11 and is electrically connected to the power supply of the magnetic stirrer 11, and the second coil 45' is fastened to the platform 21 of the lifting table 13 and is electrically connected to the electric motor 39. A small air gap, preferably of a few tenths of a millimeter to a few millimeters, is formed between the first coil 45 and the second coil 45'.

The electric motor 39 of the lifting table 13 can therefore be supplied with power by the magnetic stirrer 11 via the wireless interface 43, wherein the power supply for the electric motor 39 is controlled by the control unit of the magnetic stirrer 11, i.e. can be switched on and off and reversed in polarity, to raise or lower the platform 21 as required. In the arrangement, only the magnetic stirrer 11 therefore has a power supply, in particular a power supply unit. The lifting table 13 or the electric motor 39 of the lifting table 13 does not have its ow power supply, but uses the power supply of the magnetic stirrer 11, Via the wireless interface 43, data can also be transmitted, such as an upper and a lower end position which the platform 21 can assume. In FIGS. 2, 3 and 5, a cable 47 that connects the second coil 45' to the electric motor 39 is schematically indicated.

The user interface 19 of the magnetic stirrer 11 has two buttons, not shown, by which, when actuated, the platform 21 of the lifting table 13 can be raised or lowered. Furthermore, the control unit of the magnetic stirrer 11 is configured to automatically lower the platform 21 of the lifting table 13. This is in particular the case if a predefined time has elapsed during the operation of the arrangement or if the liquid present in the reaction flask or the heating bath becomes too hot, i.e. if the temperature of the liquid present in the reaction flask or of the heating bath exceeds a respective predefined reference value. The temperature of the liquid present in the reaction flask or of the heating bath can be detected by a respective temperature sensor.

As can in particular be seen from FIG. 3, the platform 21 of the lifting table 13 has an adapter plate 49 which is fastened to a sheet metal base 51 of the platform 21 and onto which the magnetic stirrer 11 is placed. A plurality of recesses 53 are provided in the adapter plate 49 at the upper side and are—formed in counter-shape to support feet 17 of the magnetic stirrer 11 provided at the lower side of the magnetic stirrer 11 (cf. FIG. 5). This allows a precise positioning of the magnetic stirrer 11 on the lifting table 13 and ensures a stable seat of the magnetic stirrer 11 on the lifting table 13. In FIGS. 2 and 3, the first coil 45 of the magnetic stirrer 11 is also shown that engages from above into a correspondingly shaped recess of the adapter plate 51 for the two coils 45, 45'. The second coil 45', which is not visible in FIG. 3. engages from below into this recess of the adapter plate 51. However, the adapter plate 49 can generally also be omitted and/or recesses for the support feet 17 of the magnetic stirrer 11 can be provided in the sheet metal base 51.

In FIG. 4, an alternative lifting table 13 is shown that in particular differs from the lifting table in accordance with FIGS. 1 to 3 in that the adapter plate 49 is omitted in the platform 21 and a built-in plug 55 is provided instead of the second coil 45'. The magnetic stirrer 11 then has a suitable built-in socket, not shown, at its lower side instead of the first coil 45. In the embodiment of the arrangement in accordance with FIGS. 4 and 5, the wireless interface 43 between the magnetic stirrer 11 and the lifting table 13 is therefore replaced by a wired interface 43'. In the embodiment in accordance with FIGS. 4 and 5, it is generally possible that an adapter plate is provided with recesses for the support feet 17 of the magnetic stirrer 11 or that recesses are provided in the sheet metal base 51.

In the arrangement in accordance with FIG. 5, it is indicated that a first holding rod 57 is arranged at the base 23 of the lifting table 13. The glass structure comprising the reaction glass—flask and the temperature sensor for the liquid present in the reaction glass flask can be fastened to the first holding rod 57, Furthermore, it can be seen from FIG. 5 that a second holding rod 59 is arranged at the magnetic stirrer 11, but can alternatively also be arranged at the platform 21 of the lifting table 13. The temperature sensor for the heating bath can be fastened to the second holding rod 59. The two holding rods 57, 59 can, respectively individually or jointly, also be used in the arrangement in accordance with FIGS. 1 to 3,

REFERENCE NUMERAL LIST

11 magnetic stirrer
13 lifting table
15 heating plate
17 support foot
19 user interface
21 platform
23 base
25 scissor unit
27 scissor arm
27' scissor arm
29 fixed bearing
31 floating bearing
33 screw gear
threaded spindle
37 threaded nut
39 electric motor
41 hand crank
43 wireless interface
43' wired interface
45 first coil
45' second coil
47 cable
49 adapter plate
51 sheet metal base
53 recess
55 built-in plug
57 first holding rod
59 second holding rod

The invention claimed is:

1. An arrangement comprising a magnetic stirrer, having a heating plate and a control unit for controlling the magnetic stirrer, and a lifting table having a platform on which the magnetic stirrer can be placed, wherein the lifting table has an electric motor to raise and lower the platform, and wherein a wireless or wired interface is provided between the magnetic stirrer and the lifting table and the control unit is configured to control the electric motor, via the interface.

2. The arrangement in accordance with claim 1, wherein the control unit of the magnetic stirrer is configured to automatically lower the platform of the lifting table when a predefined time elapses and/or when a predefined reference value is exceeded or fallen below by a measurement value acquired by a measuring sensor.

3. The arrangement in accordance with claim 2, wherein the measuring sensor is part of the arrangement.

4. The arrangement in accordance with claim 1, wherein the interface becomes functional by placing the magnetic stirrer onto the platform of the lifting table.

5. The arrangement in accordance with claim 1, wherein the wired interface comprises an electrical plug-in connection.

6. The arrangement in accordance with claim 1, wherein
the wireless interface comprises two inductively cooperating coils, of which a first coil is provided at the magnetic stirrer side and a second coil is provided at the lifting table side.

7. The arrangement in accordance with claim 1, wherein only the magnetic stirrer has a power supply, and the electric motor of the lifting table is supplied with power via the interface.

8. The arrangement in accordance with claim 1, wherein the control unit is configured to transmit data to the lifting table via the interface.

9. The arrangement in accordance with claim 1, wherein the magnetic stirrer comprises, at its lower side, a plurality of support feet that, when the magnetic stirrer is placed onto the platform of the lifting table, engage into counter-shaped recesses formed at the upper side of the platform.

10. The arrangement in accordance with claim 9, wherein the platform of the lifting table comprises an adapter plate and the recesses are formed in the adapter plate.

11. The arrangement in accordance with claim 1, wherein the lifting table has a base which is not moved when the platform is raised and lowered and to which a holding apparatus of the arrangement, for a glass structure is fastened.

12. The arrangement in accordance with claim 11, wherein the glass structure is part of the arrangement.

13. The arrangement in accordance with claim 1, wherein the lifting table is configured as a scissor lifting table comprising the platform, a base that is not moved when the platform is raised and lowered, and a scissor unit arranged between the platform and the base.

14. The arrangement in accordance with claim 13, wherein the lifting table comprises, as a drive, a screw gear having an axially fixed threaded spindle and a threaded nut, with the threaded spindle being driven by the electric motor and the threaded nut being displaceably guided in the two floating bearings.

15. The arrangement in accordance with claim 14, wherein the electric motor and the screw gear are provided at the platform of the lifting table, and/or the threaded spindle is additionally provided with a hand crank.

16. The arrangement in accordance with claim 1, wherein the control unit is configured to control a power supply of the electric motor.

17. The arrangement in accordance with claim 2, wherein the measuring sensor is a temperature sensor.

18. The arrangement in accordance with claim 3, wherein a further measuring sensor is provided that is part of the arrangement.

19. The arrangement in accordance with claim 18, wherein the further measuring sensor is a temperature sensor.

20. The arrangement in accordance with claim 18, wherein one of the two measuring sensors is attached to a holding apparatus of the arrangement that is fastened to the platform of the lifting table or to the magnetic stirrer.

21. The arrangement in accordance with claim 5, wherein the electrical plug-in connection has a plug and a socket.

22. The arrangement in accordance with claim 21, wherein the plug is provided at the lifting table side and the socket is provided at the magnetic stirrer side, or vice versa.

23. The arrangement in accordance with claim 11, wherein the glass structure has a reaction glass flask for a liquid to be heated.

24. The arrangement in accordance with claim 13, wherein the scissor unit having two scissor arms that are arranged in a crossed manner and that are connected to one another in an articulated manner at their centers.

25. The arrangement in accordance with claim 15, wherein the electric motor and the screw gear are provided at a lower side of the platform of the lifting table.

* * * * *